United States Patent
Parasuraman et al.

(10) Patent No.: US 11,281,641 B1
(45) Date of Patent: Mar. 22, 2022

(54) EVALUATING ENCODING HISTORY FOR LATE ENCODING BINDING OF DATA

(71) Applicant: Amazon Technologies, Inc., Seattle, WA (US)

(72) Inventors: Vijairam Parasuraman, Union City, CA (US); Andrew Edward Caldwell, Santa Clara, CA (US); Carlos Garcia-Alvarado, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 528 days.

(21) Appl. No.: 15/603,343

(22) Filed: May 23, 2017

(51) Int. Cl.
*G06F 16/00* (2019.01)
*G06F 16/22* (2019.01)
*G06F 16/23* (2019.01)
*G06F 16/2455* (2019.01)

(52) U.S. Cl.
CPC .......... *G06F 16/22* (2019.01); *G06F 16/2358* (2019.01); *G06F 16/24553* (2019.01)

(58) Field of Classification Search
CPC .............. G06F 16/22; G06F 16/24553; G06F 16/2358; G06F 16/174
See application file for complete search history.

(56) References Cited

U.S. PATENT DOCUMENTS

| | | | |
|---|---|---|---|
| 5,045,852 A | 9/1991 | Mitchell et al. | |
| 5,546,575 A | 8/1996 | Potter et al. | |
| 5,977,890 A | 11/1999 | Rigoutsos et al. | |
| 6,121,903 A * | 9/2000 | Kalkstein | H03M 7/3086 341/106 |
| 7,299,300 B2 | 11/2007 | Desai et al. | |
| 7,616,822 B2 * | 11/2009 | Ito | H04N 19/46 382/239 |
| 10,171,804 B1 * | 1/2019 | Wang | H04N 19/172 |
| 2007/0206867 A1 * | 9/2007 | Tamura | H04N 19/176 382/232 |
| 2010/0057977 A1 * | 3/2010 | Graef | G11C 7/1006 711/103 |
| 2011/0029569 A1 * | 2/2011 | Ganesh | G06F 16/284 707/796 |
| 2012/0109910 A1 * | 5/2012 | Netz | H03M 7/30 707/693 |
| 2012/0110549 A1 * | 5/2012 | Gutz | G06F 8/75 717/120 |
| 2012/0303679 A1 * | 11/2012 | Tsuchiya | G06F 16/113 707/821 |
| 2013/0132803 A1 * | 5/2013 | Xiao | H03M 13/13 714/776 |

(Continued)

OTHER PUBLICATIONS

Amazon Redshift, Database Developer Guide API, Version Dec. 1, 2012, app pages. (Year: 2012).*

*Primary Examiner* — Anhtai V Tran
(74) *Attorney, Agent, or Firm* — Robert C. Kowert; Kowert, Hood, Munyon, Rankin & Goetzel, P.C.

(57) ABSTRACT

Late encoding binding can be applied to data added to a data set according to the encoding history for the data set. When a request to add data is received, an evaluation of the encoding history can determine whether a currently specified encoding for the data can be changed. If changeable, a different encoding scheme for the data may be identified and the data added to the data set according to the different encoding scheme.

20 Claims, 10 Drawing Sheets

(56) References Cited

U.S. PATENT DOCUMENTS

| | | | | |
|---|---|---|---|---|
| 2013/0275403 | A1* | 10/2013 | Liu | G06F 16/24547 |
| | | | | 707/706 |
| 2014/0019472 | A1* | 1/2014 | Franke | G06F 16/2282 |
| | | | | 707/769 |
| 2015/0100556 | A1* | 4/2015 | Sekiguchi | H03M 7/30 |
| | | | | 707/693 |
| 2015/0178305 | A1* | 6/2015 | Mueller | G06F 16/221 |
| | | | | 707/693 |
| 2018/0260212 | A1* | 9/2018 | Wisnovsky | G06F 8/71 |
| 2018/0352489 | A1* | 12/2018 | Anchan | H04W 48/16 |
| 2019/0114438 | A1* | 4/2019 | Hersans | G06F 16/278 |

* cited by examiner

EVALUATING ENCODING HISTORY FOR LATE ENCODING BINDING OF DATA

BACKGROUND

As the technological capacity for organizations to create, track, and retain data continues to grow, a variety of different technologies for transmitting and storing the rising tide of information have been developed. One such technology, data compression, allows for the reduction of data size by representing the data differently. At a later time, data may be restored for further processing. Many different types of data may be compressed according to many different encoding techniques. Determining which encoding technique to apply is often challenging. Some techniques are more effective, generating a greater reduction in data size, for some data, while for other data a different compression technique may be better suited. Often the ability to select an encoding technique to apply to data may be limited by the resources required to perform various analyses on the data within the constraints of the entity that wishes to compress the data. Similarly, different encoding techniques impose differing burdens to perform the encoding technique. Thus, entities who wish to compress data are often limited by time, operational costs, and other encoding selection criteria source limitations to efficiently compress data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of evaluating encoding history for late encoding binding for data are described herein. Encoding data for compression, security, or processing may provide data storage and access management systems with greater capabilities, in various embodiments. Compressed, data for instance, may be more efficiently stored and transported over communication channels, such as network communications, by reducing the amount of data to be stored and/or transported, in some embodiments. Late encoding binding may be implemented to provide for the selection and application of encoding for data stored in a data store at an optimal time, such as when the data is received and stored (e.g., instead of when the structure or location for the data is created or allocated), in various embodiments. In this way, encoding selection techniques can have the opportunity to analyze more information about the data to be stored and make better informed encoding selections, in some embodiments. Encoding history may be maintained so that late encoding binding is performed without overriding previous selections which may need to be applied, such as user specified selections or maintaining backward compatibility with other systems, components, or devices, in some embodiments.

Figure 1:
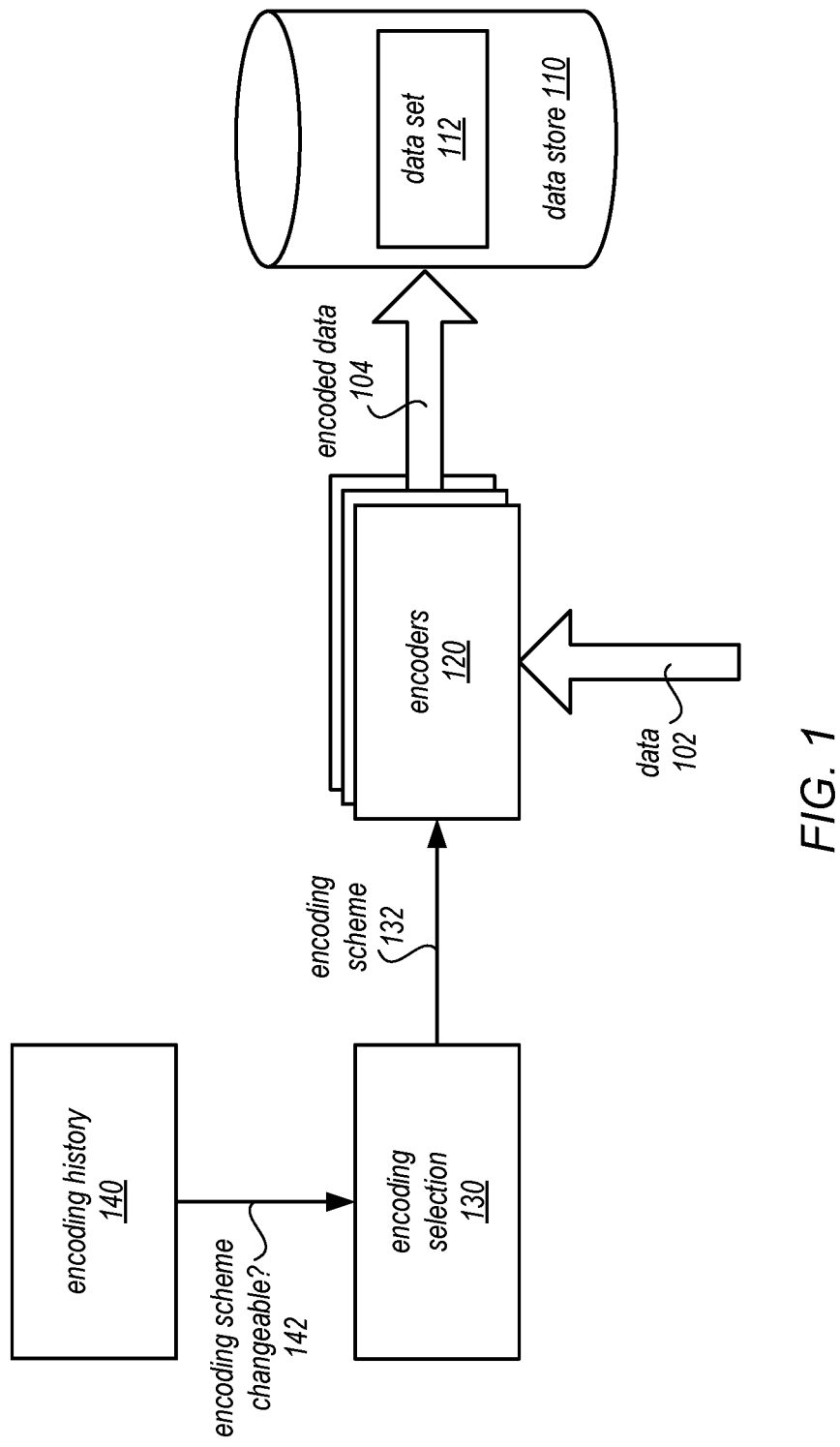
FIG. 1 illustrates a logical block diagram of evaluating encoding history for late encoding binding for data, according to some embodiments.

FIG. 1 illustrates a logical block diagram of evaluating encoding history for late encoding binding for data, according to some embodiments. Data store 110 may be a data storage and/or management system that provides access to data stored as part of a data set 112. For example, database systems, file systems, or various other data storage systems may maintain data set 110 for access on behalf of clients. Data set 112 may be a data structure or other grouping, collection, or organization of data stored in data store 110, in some embodiments. Requests to access data set 112, including requests to read, query, process, or otherwise evaluate data may be performed, in some embodiments. Requests to access data set 112 may also include requests to add data to data set 112.

In some embodiments, data stored as part of a data set 112 may be encoded. Different types of encodings may be performed. For example, various encodings that compress data (e.g., Lempel-Ziv-Oberhumer (LZO), run length, data dictionary, etc.), encrypt or secure data (e.g., public-private key pair encryption), or otherwise format data for processing (e.g., format data for particular storage systems such as database systems, media consumption platforms, analytics systems, etc.) may be implemented. In some embodiments, data may be encoded when added to a data set. In some embodiments, other encoding events, such as the expiration of a period of time, amount of access, or other criteria that triggers the encoding or re-encoding of data in a data set.

Encoding selection 130 may be implemented to select an encoding scheme 132 for data (e.g., in response to a request to add data, or other detected encoding event). For example, encoding selection 130 may map the type of data 102 to a particular encoding scheme or may analyze data 102 to perform encoding selection, as discussed below with regard to FIGS. 5 and 7-9. In at least some embodiments, prior encoding schemes may already be selected or identified for data 102. For example, when data set 112 is created (e.g., a table creation request as discussed below with regard to FIGS. 6A, 6B, and 8), encodings may be defined for the data (e.g., for the entire table, or portions thereof, such as individual columns). Encoding selection 130 may evaluate encoding history 140 to determine whether an identified encoding scheme for data 102 is changeable 142. For example, if the encoding scheme is a user-specified encoding scheme (as opposed to an automated encoding selection), then encoding selection 130 may determine that the encoding scheme cannot be changed. In other scenarios, encoding selection 130 may determine that the encoding scheme can be changed (e.g., when the encoding scheme was previously selected by an automated selection technique).

Once identified, the encoding scheme 132 may be provided so that the appropriate encoder(s) 120 may encode data 102 and store an encoded version of the data 104 as part of data set 112 in data store 110 (or re-encode data and rewrite the data according to the selected encoding scheme), in various embodiments. In this way, encoding determinations may be made when data is received or after the data is received, instead of encoding being statically defined prior to receiving the data.

Please note that the previous description of evaluating encoding history for late encoding binding for data is a logical illustration and thus is not to be construed as limiting as to the implementation of encoding history, encoding selection, encoders, a data set, a data store, or other illustrated features.

This specification begins with a general description of a provider network that implements database services, storage services, and other services that may implement evaluating encoding history for late encoding binding for data. Then various examples of one such service, a data warehouse service, including different components/modules, or arrangements of components/module that may be employed as part of implementing the techniques are discussed. A number of different methods and techniques to implement evaluating encoding history for late encoding binding for data are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
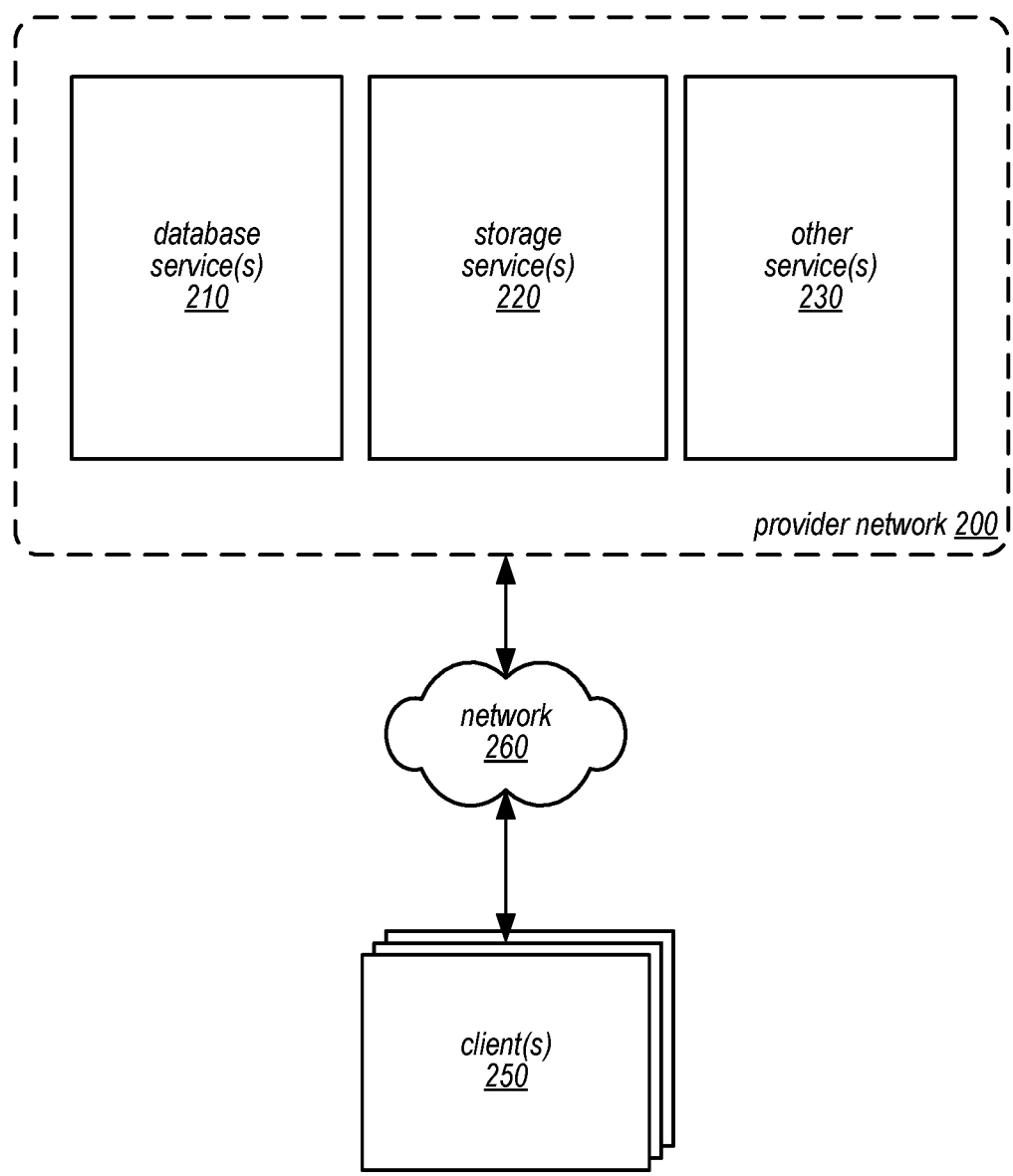
FIG. 2 is a logical block diagram illustrating a provider network offering network-based services that provide late encoding binding for data stored in the network-based services, according to some embodiments.

FIG. 2 is a logical block diagram illustrating a provider network offering network-based services that provide late encoding binding for data stored in the network-based services, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200, in one embodiment. In some embodiments, provider network 200 may implement various computing resources or services, such as database service(s) 210 or other data processing services, (e.g., a map reduce service, a data warehouse service, and other large scale data processing services), data storage services 220 (e.g., object storage services or block-based storage services that may implement a centralized data store for various types of data), and/or any other type of network based services 230 (which may include a virtual compute service and various other types of storage, processing, analysis, communication, event handling, visualization, data cataloging (which may store schema information and other metadata for data stored in other services such as database service 210, storage service (s) 220, or other services like data warehouse service 300 in FIG. 3 below), data ingestion (e.g., ETL), and security services not illustrated), in one embodiment.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of database service(s) 210, data storage service(s) 220, or other service(s) 230) may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is fully structured data, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below with regard to the example data warehouse service FIG. 3, and the database system may be scaled up or down on an as needed basis, in one embodiment. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In some embodiments, database services 210 may include services that process requests to data that is not stored in fully structured storage (e.g., non-relational or NoSQL databases). Database services 210 may access the data that is semi-structured or not-structured in storage, such as data objects of unstructured or semi-structured data in data storage service 220, in one embodiment. In other embodiments, database services 210 may locally store, managed, and access semi-structured or not-structured data.

Data storage service(s) 220 may implement different types of data stores for storing, accessing, and managing data on behalf of clients 250 as a network-based service that enables clients 250 to operate a data storage system in a cloud or network computing environment. Data storage service(s) 220 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 220 may be treated as a data lake. For example, an organization may generate many different kinds of data, stored in one or multiple collections of data objects in a data storage service 220. The data objects in the collection may include related or homogenous data objects, such as database partitions of sales data, as well as unrelated or heterogeneous data objects, such as audio files and web site log files. Data storage service(s) 220 may be accessed via programmatic interfaces (e.g., APIs) or graphical user interfaces. For example, database services 210 may access data objects stored in data storage services 220 via the programmatic interfaces to perform operations to execute queries received at database services 210.

In a least some embodiments, provider network 200 may implement a data catalog service (not illustrated), which may be one of other service(s) 230. The data catalog service may provide a catalog service that ingests, locates, and identifies data stored on behalf of clients in provider network 200 across the various database services 210 or data storage services 220. For example, yhe data catalog service may identify a customer of provider network on whose behalf a storage container in storage service 220 is storing objects. In at least some embodiments, the data catalog service may direct the transformation of data ingested in one data format into another data format. For example, data may be ingested into a database services 210 as single file or semi-structured set of data (e.g., JavaScript Object Notation (JSON)). In at least some embodiments, metadata for data that is not-structured may be stored as part of data catalog service, including information about data types, encodings, names, delimiters of fields, and/or any other information to access the data that is not-structured.

Generally speaking, clients 250 may encompass any type of client that can submit network-based requests to provider network 200 via network 260, including requests for storage services (e.g., a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, format independent data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230).

Clients 250 may convey network-based services requests (e.g., access requests to read or write data may be directed to data in data storage service(s) 230, queries to structured data processing service(s) 220, or to interact with data catalog service 240) to and receive responses from provider network 200 via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.)

necessary to establish a networking link between given client 250 and the Internet as well as between the Internet and provider network 200. It is noted that in some embodiments, clients 250 may communicate with provider network 200 using a private network rather than the public Internet.

Figure 3:
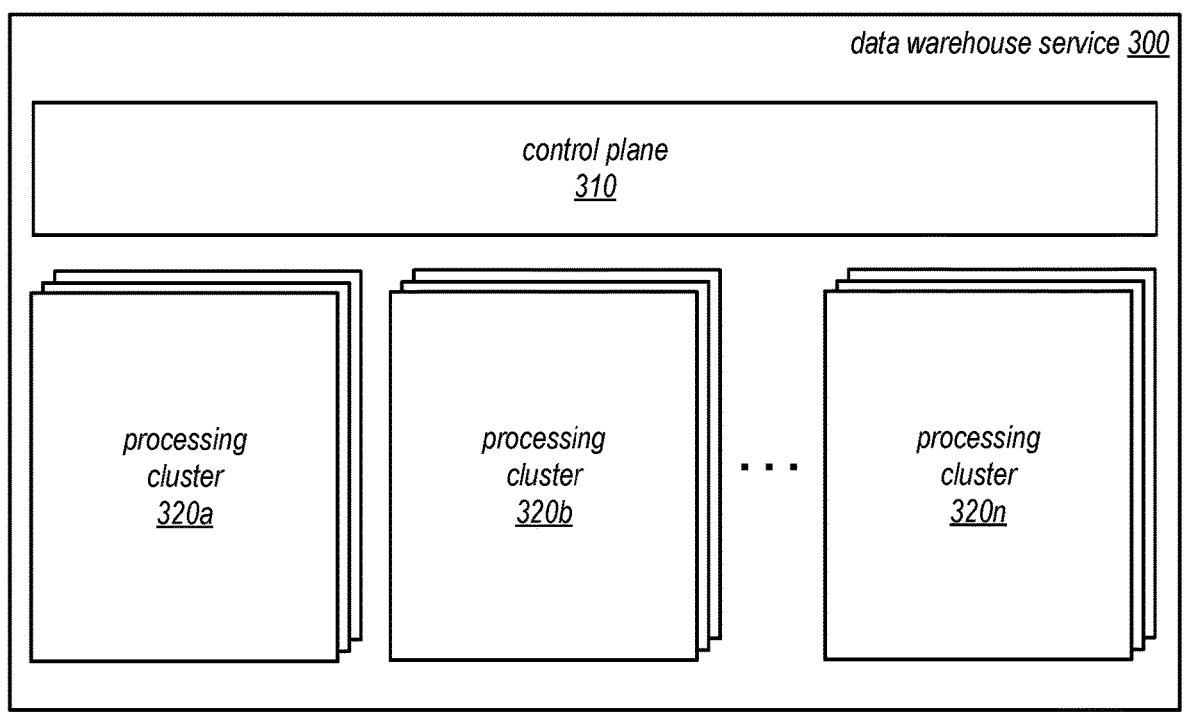
FIG. 3 is a logical block diagram of a data warehouse service that maintains and evaluates encoding history for late encoding binding for data, according to some embodiments.

In at least some embodiments, a database service 210 or data storage service 220 may be a data warehouse service. FIG. 3 is a logical block diagram of a data warehouse service that maintains and evaluates encoding history for late encoding binding for data, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") data warehouse system. However, various versions of the components discussed below as may be equally adapted to implement embodiments for various other types of database or data warehouse systems, such as row-oriented database systems. Therefore, the following examples are not intended to be limiting as to various other types or formats of structured data that may be stored, accessed, or otherwise managed by a data warehouse, like data warehouse service 300.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 1000 described below with regard to FIG. 10, in some embodiments. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300, in one embodiment.

As discussed above, various clients (or customers, organizations, entities, or users) may wish to store and manage data using a data warehouse service like data warehouse service 300. Processing clusters may respond to various requests, including write/update/store requests (e.g., to add data into storage) or queries for data (e.g., such as a Server Query Language request (SQL) for particular data), as discussed below with regard to FIGS. 4-6B, along with many other data management or storage services. Queries may be directed to data that is locally hosted as part of data warehouse service 300 or stored elsewhere that is fully structured data or queries directed to data that is not-structured, such as log records, event data, or machine generated data stored in storage service 210. In some embodiments, data warehouse service may receive updates from or access metadata for queries received at data catalog service in order to generate a query execution plan based, at least in part on metadata, such as schema information, for a data set (of structured or not-structured data).

Multiple users or clients may access a processing cluster to obtain data warehouse services, in one embodiment. In at least some embodiments, a data warehouse service 300 may provide network endpoints to the clusters which allow the clients to send requests and other messages directly to a particular cluster. Network endpoints, for example may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters, such as processing clusters 320a, 320b, through 320n, hosted by the data warehouse service 300 may provide an enterprise-class database query and management system that allows users to send data processing requests to be executed by the clusters 320, such as by sending a data processing request to a cluster control interface implemented by the processing clusters, in some embodiments. Processing clusters 320 may perform data processing operations with respect to data stored locally in a processing cluster. Requests sent to a processing cluster 320 may be directed to local data stored in the processing cluster, in some embodiments. Therefore, processing clusters may implement local data processing, (discussed below with regard to FIG. 5) to plan and execute the performance of requests with respect to local data in the processing cluster, as well encoding and decoding data (including the late encoding binding of data), in one embodiment.

Scaling clusters 320 may allow users of data warehouse service 300 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. Control plane 310 may direct scaling operations to right-size a processing cluster 320 for efficiently processing queries.

Figure 4:
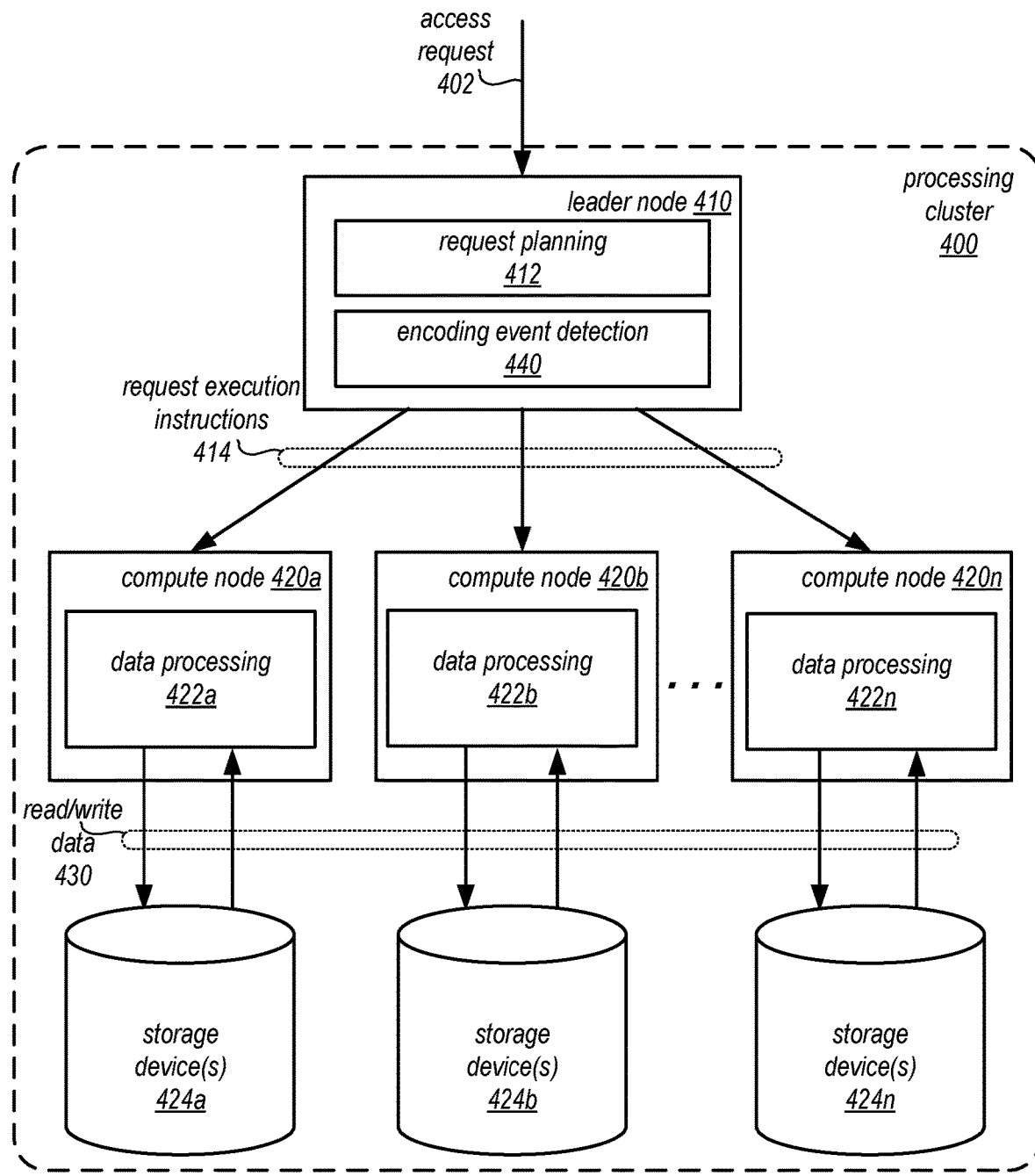
FIG. 4 is a logical block diagram illustrating a processing cluster of a data warehouse service, according to some embodiments.

FIG. 4 is a logical block diagram illustrating a processing cluster of a data warehouse service, according to some embodiments. Processing cluster 400 may be data warehouse service cluster, like processing clusters 320 discussed above with regard to FIG. 3, or another processing cluster that distributes execution of a query among multiple processing nodes, in one embodiment. As illustrated in this example, a processing cluster 400 may include a leader node 410 and compute nodes 420a, 420b, and 420n, which may communicate with each other over an interconnect (not illustrated), in one embodiment. Leader node 410 may implement request planning 412 (discussed in detail below with regard to FIG. 5) to generate plan(s) and instructions 414 for executing requests on processing cluster 400, in one embodiment. As described herein, each node in a processing cluster 400 may include attached storage, such as storage device(s) 424a, 424b, and 424n, on which a database (or portions thereof) may be stored on behalf of clients (e.g., users, client applications, and/or storage service subscribers), in one embodiment.

In at least some embodiments, leader node 410 may implement encoding event detection 440. For example, encoding event detection 440 may determine, identify, maintain, and evaluate encoding event criteria with respect to a table or database. Encoding event criteria may include criteria that evaluate the frequency or amount of updates, accesses, or changes to a table, column, row, or other subset of a table, for instance, and compare the frequency or amount with a threshold amount. If the frequency or amount exceeds the threshold amount, then an encoding event may be detected. Other encoding event criteria may include the detection of time-lapsed or expiration of time since a previous encoding analysis or encoding of a table, column, row, or other subset of a table, in one embodiment. Some requests may trigger encoding events, as discussed below with regard to FIG. 5, such as requests to add data.

Note that in at least some embodiments, data processing capability may be separated from compute nodes, and thus in some embodiments, additional components may be implemented for processing requests. Additionally, it may be that in some embodiments, no one node in processing cluster 400 is a leader node as illustrated in FIG. 4, but rather different nodes of the nodes in processing cluster 400 may act as a leader node or otherwise direct processing of requests to data stored in processing cluster 400, in one embodiment. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 400 may be implemented as part of a data warehouse service, as discussed above with regard to FIG. 3, or another service (e.g., database service(s) 210, storage service(s) 220, or other data processing service(s)). Leader node 410 may manage communications with clients, such as clients 250 discussed above with regard to FIG. 2, in one embodiment. For example, leader node 410 may be a server that receives an access request (e.g., a query for data or a request to add data) 402 from various client programs (e.g., applications) and/or subscribers (users), then parses them and develops an execution plan (e.g., query plan(s)) to carry out the associated database operation(s).

Leader node 410 may develop the series of steps necessary to obtain results for the access request 402, in one embodiment. Query 402 may be directed to data that is stored locally within processing cluster 400 (e.g., at one or more of compute nodes 420), in one embodiment. Leader node 410 may also manage the communications among compute nodes 420 instructed to carry out database operations for data stored in the processing cluster 400, in one embodiment. For example, node-specific request instructions 414 may be generated or compiled code that is distributed by leader node 410 to various ones of the compute nodes 420 to carry out the steps needed to perform access request 402, including executing the code to generate intermediate results of access request 402 at individual compute nodes that may be sent back to the leader node 410, in one embodiment. Leader node 410 may receive data and responses or results from compute nodes 420 in order to determine a final result for access request 402, in one embodiment. A database schema, data format and/or other metadata information for the data stored among the compute nodes, such as the data tables stored in the cluster, may be managed and stored by leader node 410 or obtained from a separate store (e.g., a data catalog service). Request planning 412, as discussed in more detail below with regard to FIG. 5, may account for encodings, including encoding history, in order to perform late encoding binding, in one embodiment.

Processing cluster 400 may also include compute nodes, such as compute nodes 420a, 420b, and 420n. Compute nodes 420, may for example, be implemented on servers or other computing devices, such as those described below with regard to computer system 1000 in FIG. 10, and each may include individual query processing "slices" defined, for example, for each core of a server's multi-core processor, one or more data processing engine(s), such as data processing 422a, 422b, and 422n, to execute the instructions 414 or otherwise perform the portions of the request plan assigned to the compute node, in one embodiment. Data processing 422 may access a certain memory and disk space in order to process a portion of the workload for a query (or other database operation) that is sent to one or more of the compute nodes 420. Data processing 422 may access attached storage, such as 422a, 422b, and 422n, to perform operation(s), in one embodiment. For example, data processing 422 may scan data in attached storage 424, access indexes, perform joins, semi joins, aggregations, or any other processing operation assigned to the compute node 420, in one embodiment. As noted below in FIG. 5, data processing 422 may include encoders to encode or decode data in order to provide access to data or store additional data. Compute nodes 420 may send intermediate or final results from requests back to leader node 410 for final result generation (e.g., combining, aggregating, modifying, joining, etc.)

Storage device(s), such as storage devices 424a, 424b, and 424n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 5:
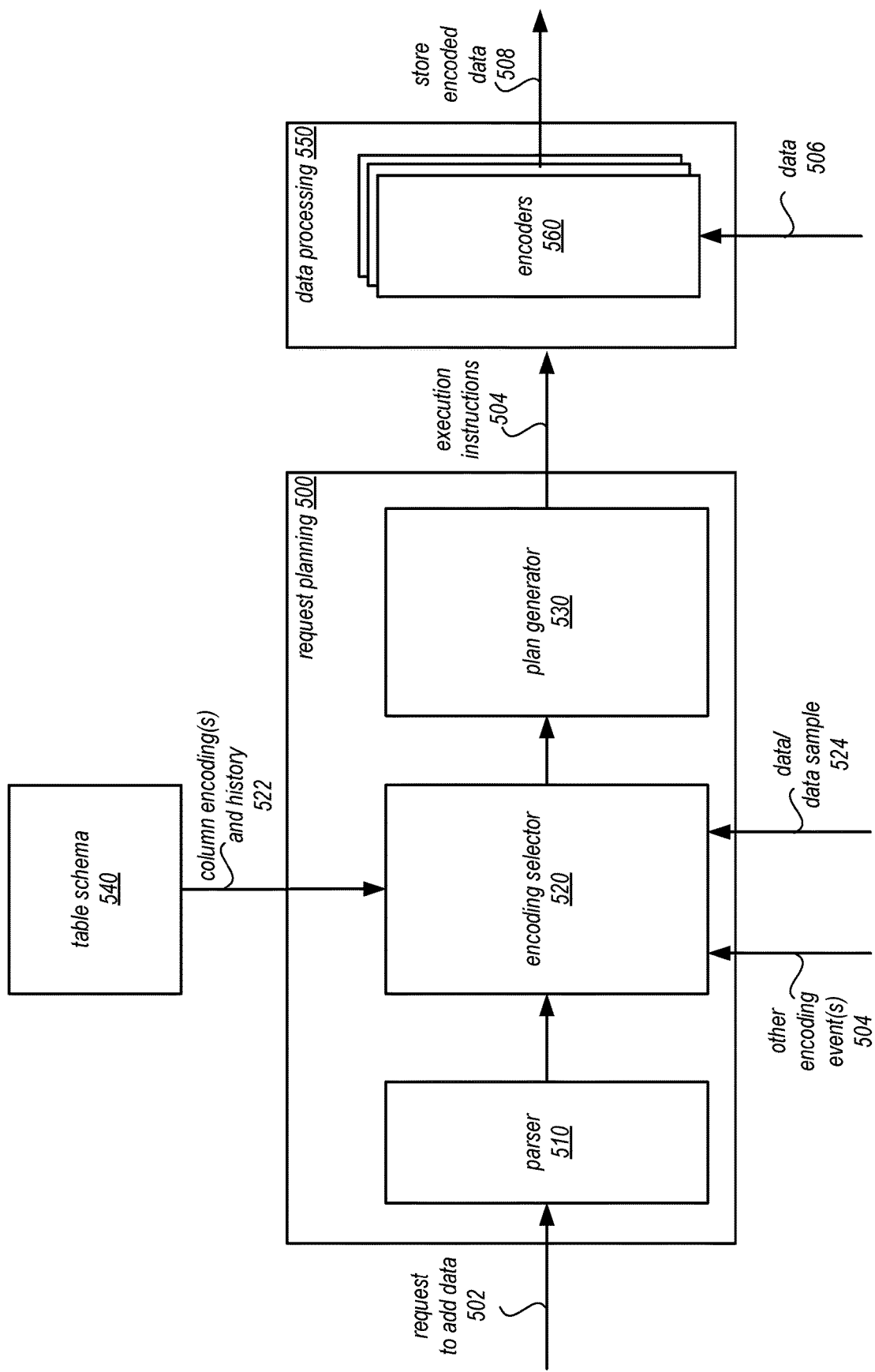
FIG. 5 is a logical block diagram illustrating encoding selection for data to a table in a data warehouse, according to some embodiments.

FIG. 5 is a logical block diagram illustrating encoding selection for data to a table in a data warehouse, according to some embodiments. Request planning 500 may implement parser 510 to receive a request to add data 502 (e.g., a query statement, such as a SQL statement, other type of request to add data, such as a COPY request discussed below) and determine the various requested operations to perform as a result of the request. For example, parser 510 may generate a parse tree for a given request input string to separate out the various request clauses, fields, flags, predicates, conditions, commands, or other information for planning and optimization.

Based on the output of parser 510, encoding selector 520 may select one or more encodings to apply to different columns included in the data request to add data. For example, as illustrated in FIG. 5, encoding selector 540 may access table schema 540 to obtain column encoding(s) and history 522, in some embodiments. For example, column encoding(s) and history may include the source and/or timing of the selection of the encoding, in some embodiments. For instance, the encoding may specify whether a user specified the encoding for a column or whether the encoding was automatically selected for the column. In another example, the encoding history may specify the instruction, request, operation, and/or timestamp that specified the encoding for a column (e.g., encoding specified according to a CREATE table request or a previously received COPY request). As discussed with regard to FIGS. 7-9 below, encoding selector 520 may apply change limitations or criteria to column encoding(s) and history 522 determine whether an encoding for each column can be changed. For example, a criteria could specify the source/author of the encoding as indicative of whether the encoding can be changed (e.g., if encoding is user specified, then encoding cannot be changed, or if encoding is automatically selected, then encoding cannot be changed). An evaluation may be performed with respect to the type of operation that specified the encoding, in one embodiment. For example, encodings specified as part of a CREATE request can be changed, but encodings specified by later requests (e.g., prior requests to add data) cannot be changed. The amount of time since the encoding was selected could be compared with a time threshold (e.g., the amount of time since a timestamp for specify the encoding exceeds the threshold, then the encoding scheme can be changed), in one embodiment. Similar techniques may be performed in response to other encoding event(s) 504, triggered or detected at encoding event detection 440 in FIG. 4 above.

For those column encodings that can be changed, encoding selector 520 can identify or determine the encoding to apply to the column. For example, encoding selector may apply a rules-based selection engine that identifies one or more feature of the column (e.g., data type, table creator, database storing the table, etc.), and determine which encoding satisfies the rules or criteria as applied to the identified features of the column. In some embodiments, a statistical analysis (e.g., a machine-based learning model) may be performed to classify the column (e.g., according to column features) in order to select an encoding according to the model. In at least some embodiments, data for the columns (or a sample thereof) 524 may be obtained and analyzed (e.g., according to the statistical analysis to determine features of the data that better identify the optimal encoding for the column according to the model.

Once identified and/or selected, the encodings for the data may be provided to plan generator 530. Plan generator 530 may implement an optimizer or other component that rewrites the parsed request, in one embodiment. For example, plan generator 530 may access table schema 540 (not illustrated) to evaluate definitions, including the names and data types of each column, physical information (e.g., partitions information), number of rows, number of distinct values, value ranges, value cardinality, value distribution, indexes, views, etc.), to rewrite portions of the parse tree, such as changing the location or ordering of predicates, join operations, or other portions or operations in the parse tree.

Plan generator 530 may perform various operations to generate a request execution plan (e.g., a tree of plan operation nodes, which may be later used to generate request execution code). For example, plan generator 530 may perform a cost-based optimization to select one of various combinations or orderings of plan operator nodes in a tree that produces a least costly plan to execute. Plan generator 530 may include as part of the operations encoding (and/or decoding) instructions (where appropriate), in some embodiments. Plan generator 530 may populate a template, message, request, or other data structure for performing execution instructions 504. A remote data processing client, such as compute nodes in FIG. 4 implementing data processing 550, may interpret, access, or utilize the data structure to execute the instructions 504. In some embodiments, plan generator 530 may generate request execution code or other execution instructions 504 to perform the request plan. Similarly, execution plans for other encoding events may provide instructions to read, decode, re-encode (according to a different encoding scheme), and store the encoded version of the data at data processing 550.

Data processing 550, which may be implemented as part of compute nodes in FIG. 4 discussed above, may implement one or more encoders 560, which may apply the selected encoding schemes to data 506. The encoded version of the data generated by encoders 560 may then be stored 508.

Figure 6A:
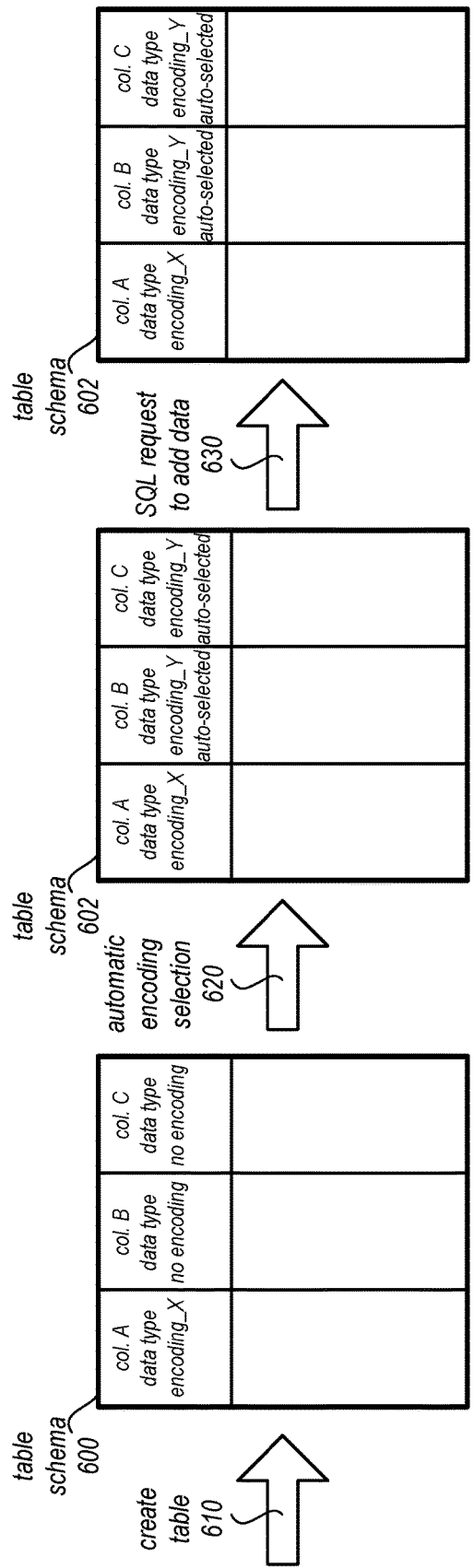
FIGS. 6A-6B are logical block diagrams illustrating changes to encoding history in a table schema, according to some embodiments.
Figure 6B:
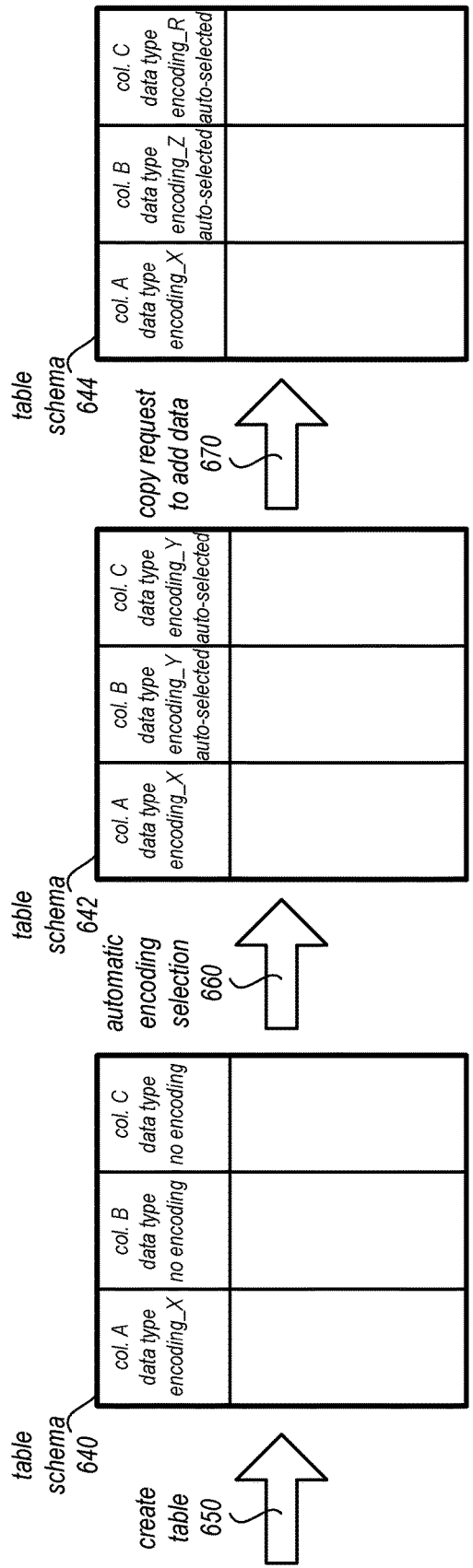

FIGS. 6A and 6B are logical block diagrams illustrating changes to encoding history in a table schema, according to some embodiments. In FIG. 6A, the progression of table schema 602 is illustrated. A request to create the table 610 may be received that specifies for a table columns A, B, and C, along with the respective data types for columns A, B, and C. Creation request may also specify that column A is to be encoded according to encoding scheme X. Table scheme 600 may be create that includes the columns, data types, and specified encoding schemes (or lack thereof).

Automatic encoding selection 620 may be performed as part of performing a table creation, in some embodiments, or separately as part of a background or asynchronous selection process for a table schema. For example, automated encoding selection 620 may provide default encoding techniques (e.g., encoding scheme Y) and update table schema 602 accordingly for columns with no specified encoding (e.g., columns B and C). In at least some embodiments, the updates to table schema 602 may include an indication that the encodings for columns B and C were automatically selected (e.g., as opposed to being specified by a user). As indicated at 630, a SQL request to add data (e.g., INSERT INTO, SELECT INTO, INSERT (SELECT *), etc.) may b may be received that triggers the insertion of data to the table stored according to table schema 602. In some embodiments, the type of request to add data, such as SQL request 630 may not change or modify either the user-specified encodings or automatically selected encodings. However, in some embodiments, a user may perform DDL requests to explicitly change encoding types for columns (not illustrated), which would cause a change to table schema 602.

In FIG. 6B the progression of table schema 640 is illustrated. A request to create the table 650 may be received that specifies for a table columns A, B, and C, along with the respective data types for columns A, B, and C. Creation request 650 may also specify that column A is to be encoded according to encoding scheme X. Table scheme 640 may be create that includes the columns, data types, and specified encoding schemes (or lack thereof).

Automatic encoding selection 660 may be performed as part of performing a table creation, in some embodiments, or separately as part of a background or asynchronous selection process for a table schema. For example, automated encoding selection 660 may provide default encoding techniques (e.g., encoding scheme Y) and update table schema 642 accordingly for columns with no specified encoding (e.g., columns B and C). In at least some embodiments, the updates to table schema 642 may include an indication that the encodings for columns B and C were automatically selected (e.g., as opposed to being specified by a user).

As indicated at 670, a copy request may be received to add data, in some embodiments. As part of performing the copy request, an automated selection may be performed with respect to data added to the table. In at least some embodiments, a determination may be made as to whether a column's encoding was user-specified, or not, as discussed below with regard to FIG. 9. If not, as in the case of columns B and C, then a change to the encoding scheme in table schema 642 may be performed. For example, as with automatic encoding selection 660 above, default encoding techniques may be applied based on further analysis of additional data or features in table schema (e.g., statistics collected about data, such as the cardinality of values within a column). Other data analysis, such as discussed above with regard to FIG. 5, may be performed. As The updated table schema 644 may include the different encoding selections (encoding Z for column B and encoding R for column C) along with an indication that the updates were performed as part of automated selection, in some embodiments.

Figure 7:
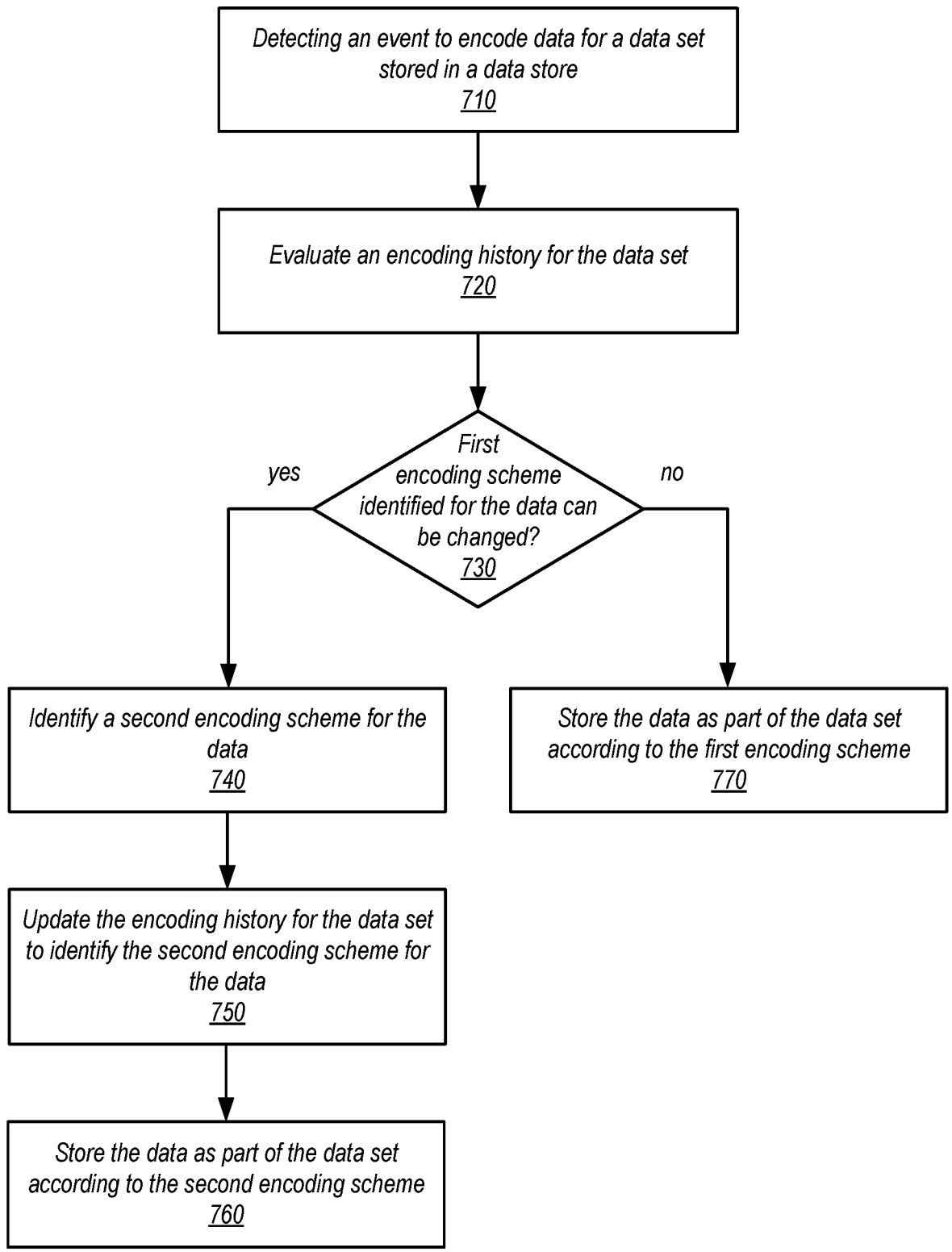
FIG. 7 is a high-level flowchart illustrating methods and techniques to evaluate encoding history for late encoding binding for data, according to some embodiments.

Although FIGS. 2-6B have been described and illustrated in the context of a provider network implementing different services, like data warehousing service 300, the various components illustrated and described in FIGS. 2-6B may be easily applied to other data processing or storage systems that process and/or store data on behalf of clients. As such, FIGS. 2-6B are not intended to be limiting as to other embodiments of evaluating encoding history to perform late encoding binding for data. FIG. 7 is a high-level flowchart illustrating methods and techniques to evaluate encoding history for late encoding binding for data, according to some embodiments. Various different systems and devices may implement the various methods and techniques described below, either singly or working together. For example, a processing cluster, such as described above with regard to FIG. 6, may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 710, an event to encode data for a data stored in a data store may be received, according to some embodiments. A data set may be data stored in a structured or unstructured data store. For example, a data set may be a table, or other data structure that organizes data, that may be stored in structured data store, such as database (e.g., like data warehouse 300 in FIG. 3 above), or in an unstructured data store, such as an object-based store or non-relational database (e.g., NoSQL database), in one embodiment. The encoding event may be a request to add data, in some embodiments. A request to add data may be formatted or received according to a protocol, interface, or other format for the data store, in one embodiment. For example, a structured query language (SQL) query may be a request to add data (e.g., an INSERT statement) received via an interface for relational database storing a table (e.g., the data set), in one embodiment. The request to add data may be formatted according to a programmatic or other interface specific to (or independent of) the data store, in one embodiment. For example, a copy request (e.g., as discussed above with regard to FIG. 6B) or other request to put, add, upload, move, transfer, or send data from one location to the data store may be received via a programmatic interface (e.g., an API) for the data store, in one embodiment. The request may be received via a graphical user interface (GUI) or through a command line interface (CLI), in one embodiment.

In some embodiments, the event to encode data may be detected according to one or more encoding event detection criteria evaluated with respect to the data set, data, or other systems, components, or devices implementing the data store. For example, the number of changes to a column of a table may be compared with change threshold for a table which may trigger an encoding event for the column if the change threshold is exceeded. Encoding event detection criteria may include criteria that evaluate the frequency or amount of updates, accesses, or changes to a table, column, row, or other subset of a table, time-lapsed or expiration of time since a previous encoding analysis or encoding of a table, column, row, or other subset of a table, or in response to a user request to re-encode (or re-evaluate) the encoding of the data.

As indicated 720, an encoding history for the data set may be evaluated, according to some embodiments. The encoding history may be maintained together with other metadata for the data set, in one embodiment, such as part of a table schema or other set of data describing the data set. In one embodiment, the encoding history may be separately maintained from other metadata, such as a separate encoding history store or repository for a data store.

The evaluation of the encoding history may determine whether an encoding specified for the data can be changed, in some embodiments. For example, an encoding history may identify the lineage or history of encodings that have been specified for the data (e.g., identifying encoding A, then encoding, B, then encoding C, and so on) which may be evaluated with respect to limitations or other criteria for changing the encoding scheme of the data. Encoding history may include the source and/or timing of the selection of the encoding, in some embodiments. For instance, the encoding may specify whether a user specified the encoding (e.g., for a column or table) or whether the encoding was automatically selected for the data. In another example, the encoding history may specify the instruction, request, operation, and/or timestamp that specified the encoding (e.g., encoding specified according to a CREATE table request or a previously received COPY request). Encoding change limitations or criteria may examine one or more of the portions of information stored in encoding history to determine whether an encoding can be changed. For example, a criteria could specify the source/author of the encoding as indicative of whether the encoding can be changed (e.g., if encoding is user specified, then encoding cannot be changed, or if encoding is automatically selected, then encoding cannot be changed). An evaluation may be performed with respect to the type of operation that specified the encoding, in one embodiment. For example, encodings specified as part of a CREATE request can be changed, but encodings specified by later requests (e.g., prior requests to add data) cannot be changed. The amount of time since the encoding was selected could be compared with a time threshold (e.g., the amount of time since a timestamp for specify the encoding exceeds the threshold, then the encoding scheme can be changed), in one embodiment.

As indicated by the negative exit from 730, if the first encoding scheme identified for the data cannot be changed, then as indicated at 770, the data may be stored as part of the data set according to the first encoding scheme. For example, the first encoding scheme may be applied to generate an encoded version of the data, and then the encoded version of the data may be written to attached or remote storage storing the data set. For instance, programmatic requests formatted according to an API for a storage service may be generated and include as part of a payload the encoded version of the data. In some embodiments, a storage engine may be implemented to receive an instruction or request for a type of encoding along with the data to store and perform the encoding of and storage of the data, such as the compute nodes discussed above with regard to FIGS. 4-6.

As indicated by the positive exit from 730, if the data can be changed, then a second encoding scheme may be identified for the data, as indicated at 740, in some embodiments. For example, a user may specify an encoding for the data along with the request to add data which may be different than the first encoding scheme identified for the data. In another embodiment, techniques to sample, analyze, or automatically identify an encoding scheme for the data may be performed, as discussed above with regard to FIG. 5. In some embodiments, the data type or data (or data set) may be mapped to a default encoding scheme (e.g., data type A to encoding scheme X, data type b to encoding scheme Y, etc.).

The encoding scheme for the data set may be updated to identify the second encoding scheme for the data, according to some embodiments, as incited at 750. For example, the encoding history may be written or overwritten with a code or other indicator identifying the second encoding scheme. Other information, such as the source and/or timing of the selection of the encoding, whether a user specified the encoding, whether the encoding was automatically selected for the data, or the instruction, request, operation, and/or timestamp for the request to add the data, may be included in the encoding history, in some embodiments.

As indicated at 760, the data may be stored as part of the data set according to the second encoding scheme, in various embodiments. The second encoding scheme may be applied to generate an encoded version of the data, and then the encoded version of the data may be written to attached or remote storage storing the data set. For instance, programmatic requests formatted according to an API for a storage service may be generated and include as part of a payload the encoded version of the data. In some embodiments, a storage engine may be implemented to receive an instruction or request for a type of encoding along with the data to store and perform the encoding of and storage of the data, such as the compute nodes discussed above with regard to FIGS. 4-6.

Figure 8:
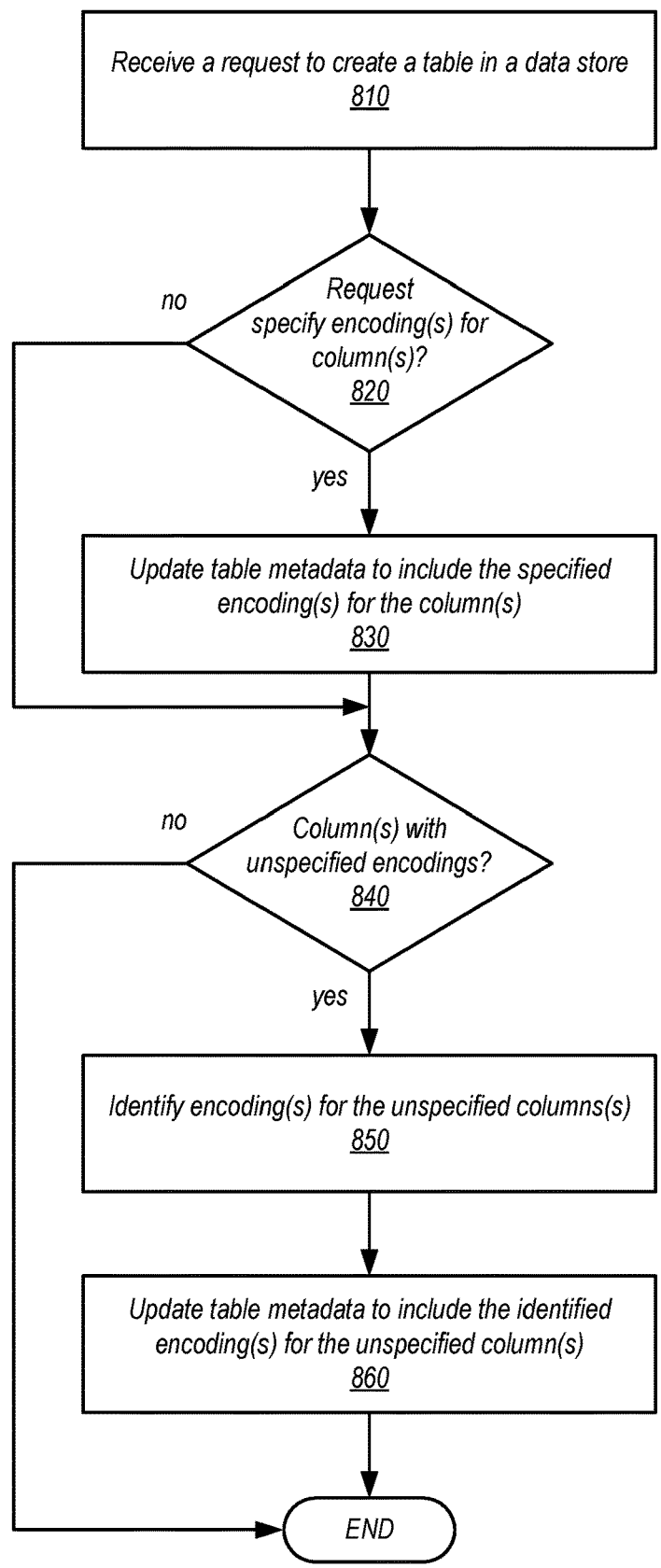
FIG. 8 is a high-level flowchart illustrating methods and techniques to include encoding history as part of creating a table, according to some embodiments.

Encoding history may be initialized, allocated, or otherwise begun upon creation of the data sets (or data objects/structures stored within the data sets), in various embodiments. For example, the creation of a table (e.g., as part of a database), may initialize or trigger the creation of encoding history for the table, in various embodiments. FIG. 8 is a high-level flowchart illustrating methods and techniques to include encoding history as part of creating a table, according to some embodiments. As indicated at 810, a request may be receive to create a table in a data store, in some embodiments. For example, the request may be formatted according to a data definition language (e.g., SQL CREATE statement) or other command, request, or protocol invoking the creation of a new table (e.g., according to an API) for the database or other data store storing the table.

As indicated at 820, the creation request may specify the same or different encodings for one or more columns in the table. For example, the table may be stored in a column-oriented fashion (as discussed above with regard to data warehouse service 300 in FIG. 3), so that the fields or data values of a single column across multiple rows of the table may be stored together (e.g., in the same data blocks or pages of storage devices). The request may specify encoding names (e.g., LZO, runlength, etc.) or include codes, set flags, or otherwise provide identifiers that map to encoding schemes along with the one or more columns to which the encoding scheme is specified (e.g., applies to columns A, D, and E). If the creation request specifies encoding(s) for column(s), then, as indicated at 830, the table metadata may be updated to include the specified encoding(s) for the column(s), in various embodiments. For example, the names, codes, flags, or identifiers may be stored or written to the table schema (e.g., dictionary, mapping information, etc.) to indicate the specified encodings. In some embodiments, other information, such as an indication that the scheme was specified by a user as part of a creation request, may be included. Alternatively, in other embodiments, no such indication that the encoding was specified by a user may be included.

As indicated by the positive exit from 840, it may be that the creation request does not specify encodings for all columns in the table, in some embodiments. For example, an evaluation of the creation request may leave one or multiple columns as un-specified with respect to encodings (even if other information for the column, such as name, data type, and so on, is included). As indicated at 850, encoding(s) for the unspecified column(s) may be identified, in various embodiments. For example, techniques to sample, analyze, or automatically identify an encoding scheme for the column may be performed (if data for the column is accessible/available), as discussed above with regard to FIG. 5. In some embodiments, the data type or data (or data set) may be mapped to a default encoding scheme (e.g., data type A to encoding scheme X, data type b to encoding scheme Y, etc.). In at least some embodiments, an encoding scheme may be specified for all columns, while in other embodiments, automated selection of encoding schemes may be performed a subset of unspecified columns (e.g., columns for which automated selection can be performed, such as known column data value types mapped to encoding schemes).

As indicated at 860, the table metadata for the table may be updated to include the identified encoding(s) for the unspecified column(s), in various embodiments. For example, the names, codes, flags, or identifiers may be stored or written to the table schema (e.g., dictionary, mapping information, etc.) to indicate the specified encodings. In some embodiments, other information, such as an indication that the scheme was automatically selected as part of performing a creation request, may be included. Alternatively, in other embodiments, no such indication that the encoding was automatically selected may be included.

Figure 9:
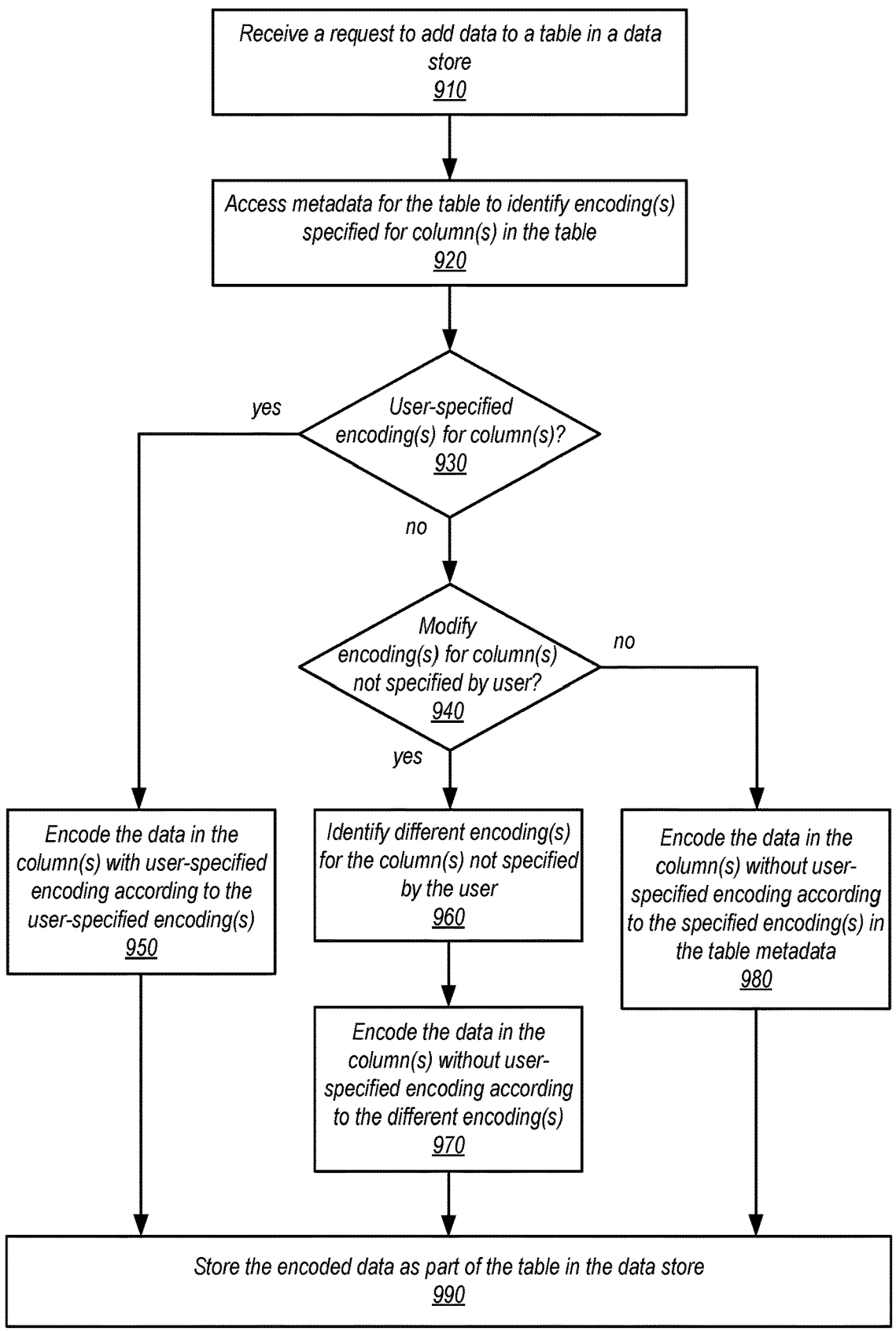
FIG. 9 is a high-level flowchart illustrating methods and techniques to determine modifications to encodings for columns in a table, according to some embodiments.

In some embodiments, user-specified encodings may be protected from automated encoding selection in order to preserve the autonomy of the user to identify encodings (even if such encodings may be suboptimal when compared with an automated selection). FIG. 9 is a high-level flowchart illustrating methods and techniques to determine modifications to encodings for columns in a table, according to some embodiments. As indicated at 910, a request to add data to a table in a data store may be received. For example, as discussed above with regard to FIGS. 6A and 6B, a structured query language (SQL) query may be a request to add data (e.g., an INSERT or other statement as discussed above with regard to FIG. 6A) received via an interface for relational database storing the table (e.g., the data set), in one embodiment. The request to add data may be formatted according to a programmatic or other interface specific to (or independent of) the data store, in one embodiment. For example, a copy request (e.g., as discussed above with regard to FIG. 6B) or other request to put, add, upload, move, transfer, or send data from one location to the data store may be received via a programmatic interface (e.g., an API) for the data store, in one embodiment.

As indicated at 920, metadata for the table may be accessed to identify encoding(s) specified for column(s) in the table. For example, a data catalog, or other table schema information may be accessed in storage devices that store the table, in one embodiment. In another embodiment, a separate data catalog or store (e.g., a network-based service that stores metadata for the table) may be accessed (e.g., via programmatic requests) to retrieve the metadata for the table (or specifically encoding information for the table).

As indicated at 930, user-specified encoding(s) for column(s) may be identified, in some embodiments. For example, the source or author of an encoding selection may be explicitly identified in the encoding history (e.g., by evaluating a separate user tag, indicator, or other identifier), in one embodiment. In another embodiment, the source or author of an encoding selection may be implicitly identified in the encoding history (e.g., by detecting another tag, indicator, or identifier that points automated selection—not a user—as the source of the encoding's selection), in one embodiment. As indicated at 950, the data in the column(s) with user-specified encodings may be encoded according to the user specified encoding(s), in various embodiments.

As indicated at 940, a determination may be made as to whether identified encodings not specified by a user should be modified, in various embodiments. For example, in some embodiments the type of request to add the data may determine whether the non-user specified encodings should be modified. If the request is a SQL statement, for instance, then the non-user specified encodings may not be modified, in one embodiment. If the request is a COPY request, then the non-user specified encodings may be modified, in some embodiments. In some embodiments, the modification determination may be made with respect to other criteria, such as the time since the selection of the identified encoding (e.g., by comparing the amount of time to a threshold). Different modification criteria may be applied for different types of column(s), in some embodiments. For example, known data types for columns may be evaluated for modification by applying a time threshold while unknown (e.g., custom) data types for columns may be evaluated by performing a data analysis or other sampling technique (e.g., as discussed above with regard to FIG. 5), in some embodiments, to determine whether another encoding could be identified that is more optimal than the currently identified encoding.

As indicated at 960, for those columns determined for modification, different encoding(s) for the column(s) not specified by the user may be identified. As noted above, automated selection of encoding techniques may be performed in different ways. Techniques to sample, analyze, or automatically identify an encoding scheme for the column(s) may be performed (if data for the column is accessible/available), as discussed above with regard to FIG. 5. In some embodiments, the data type or data (or data set) may be mapped to a default encoding scheme (e.g., data type A to encoding scheme X, data type b to encoding scheme Y, etc.). As indicated at 970, the data in the column(s) without user-specified encoding may be encoded according to the identified different encoding(s), in various embodiments. Likewise, for those column(s) without user-specified encoding and not identified for modification, the data may be encoded in the column(s) according to the specified encodings in the table metadata, as indicated at 908, in various embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of evaluating encoding history for late encoding binding for data as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
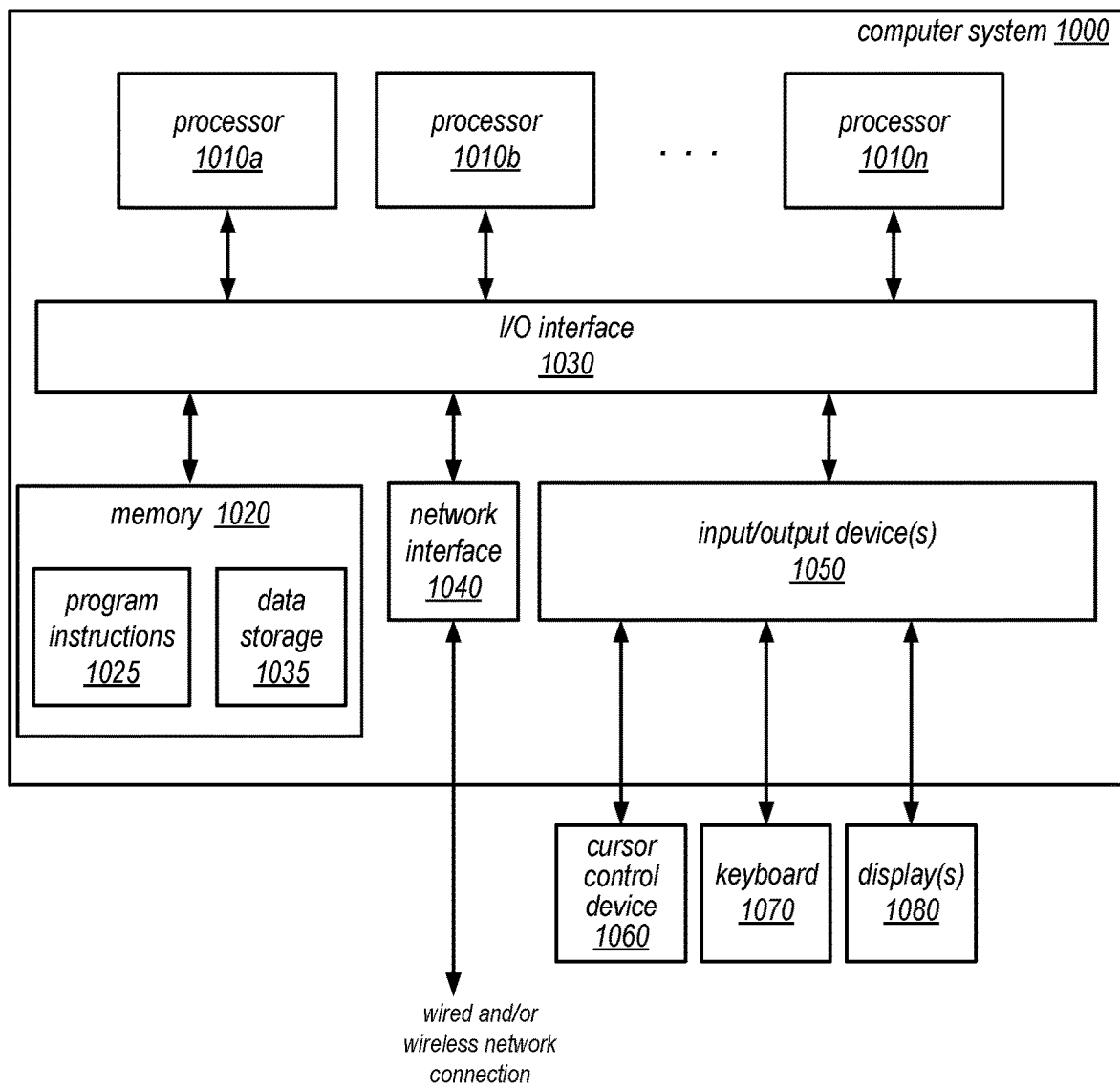
FIG. 10 illustrates an example system to implement the various methods, techniques, and systems described herein, according to some embodiments.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
create a table in data store;
include, in an encoding history for the table, a description of one or more encoding schemes specified for the table;
receive a request to add data to the table in the data store;
in response to the receipt of the request:
identify, from the encoding history, one encoding scheme of the one or more encoding schemes for the data;
identify, from the encoding history, a source that previously selected the one encoding scheme for the data, wherein the source indicates whether the one encoding scheme was user-specified or automatically selected;
evaluate a change criteria with respect to the source that previously selected the one encoding scheme to determine whether the source that previously selected the one encoding scheme can be overridden and the previously selected one encoding scheme can be changed to a different encoding scheme;
responsive to a determination that the source that previously selected the one encoding scheme can be overridden and that the one encoding scheme can be changed according to the evaluation of the change criteria with respect to the source:
identify the different encoding scheme for the data;
update the encoding history for the table to indicate a change from the one encoding scheme to the different encoding scheme identified for the data; and
store the data as part of the table in the data store according to the different encoding scheme.

2. The system of claim 1, wherein the determination that the source that the previously selected the one encoding scheme can be overridden and that the one encoding scheme can be changed is based on a determination that the source of the one encoding scheme is not user-specified.

3. The system of claim 1, wherein the method further comprises:
receive a second request to add other data to the table in the data store;
in response to the receipt of the second request:
evaluate the encoding history for the table to determine that another one of the one or more encoding schemes identified for the other data in the encoding history cannot be changed, wherein the other one of the one or more encoding schemes is a user-specified encoding scheme; and store the data as part of the data set in the data store according to the different encoding scheme.

4. The system of claim 1, wherein the data store is a data warehouse service, wherein the table stored in the data warehouse service, wherein the table is stored in column-oriented fashion at the data warehouse service, and wherein the one or more encoding schemes are specified for different columns of the table.

5. A method, comprising:

detecting an event to encode data for a data set stored in a data store;

in response to detecting the event to encode data:

identifying, from an encoding history for the data set, a first encoding scheme for the data;

identifying, from the encoding history, a source that previously selected the first encoding scheme for the data, wherein the source indicates whether the first encoding scheme was user-specified or automatically selected;

evaluating a change criteria with respect to the source that previously selected the one encoding scheme to determine whether the source that previously selected the first encoding scheme can be overridden and the previously selected one encoding scheme can be changed to a different encoding scheme;

responsive to determining that the source that previously selected the first encoding scheme can be overridden and that the first encoding scheme can be changed according to the evaluation of the change criteria with respect to the source:

identifying the second encoding scheme for the data;

updating the encoding history for the data set to indicate a change from the first encoding scheme to the second encoding scheme identified for the data; and storing the data as part of the data set in the data store according to the second encoding scheme.

6. The method of claim 5, wherein evaluating the change criteria with respect to the source that selected the one encoding scheme indicated in the description of the encoding history to determine whether the source that previously selected the first encoding scheme can be overridden and the first encoding scheme can be changed to the second encoding scheme according to the source comprises evaluating the instruction, request, operation, or timestamp associated with the one encoding.

7. The method of claim 5, wherein the data set is a table, and wherein the method further comprises:

receiving a request to create the table in the data store;

determining that the creation request does not specify an encoding scheme for the table;

identifying the first encoding scheme for the table; and updating the encoding history to indicate the identification of the first encoding scheme for the table.

8. The method of claim 5, wherein identifying the first encoding scheme for the data comprises identifying a default encoding scheme for the table.

9. The method of claim 8, wherein identifying the second encoding scheme for the data comprises analyzing the data or a portion of the data to select one of a plurality of different encoding schemes as the second encoding scheme.

10. The method of claim 5, wherein the data set is a table, wherein the data is for one or more columns in the table, wherein the request to add the data includes is part of a request to add other data stored in one or more other columns in the table, wherein storing the data as part of the data set in the data store according to the second encoding scheme stores the data in the one or more columns of the table; and wherein the method further comprises, storing the other data in the one or more other columns in the table according to a third encoding scheme.

11. The method of claim 10, further comprising:

prior to storing the other data in the one or more other columns in the table according to a third encoding scheme, evaluating the encoding history for the data set to determine that the third encoding scheme identified for the one or more other columns cannot be changed.

12. The method of claim 10, further comprising:

prior to storing the other data in the one or more other columns in the table according to a third encoding scheme:

evaluating the encoding history for the data set to determine that the third encoding scheme identified for the one or more other columns can be changed; and determining that the third encoding scheme for the one or more other columns should not be modified.

13. The method of claim 5, wherein the data store is implemented as part of a relational database, wherein the data set is a table in the relational database, and wherein the first encoding scheme is selected for the table in response to a request to create the table received at the relational database.

14. A non-transitory, computer-readable storage medium, storing program instructions that when executed by one or more computing devices cause the one or more computing devices to implement:

receiving a request to add data to a data set stored in a data store;

in response to receiving the request:

identifying, from an encoding history for the data set, a first encoding scheme for the data;

identifying, from the encoding history, a source that previously selected the first encoding scheme for the data, wherein the source indicates whether the first encoding scheme was user-specified or automatically selected;

evaluating a change criteria with respect to the source that previously selected the one encoding scheme to determine whether the source that previously selected the first encoding scheme can be overridden and the previously selected one encoding scheme can be changed to a different encoding scheme;

responsive to determining that the source that previously selected the first encoding scheme can be overridden and that the first encoding scheme can be changed according to the evaluation of the change criteria with respect to the source:

identifying the second encoding scheme for the data;

updating the encoding history for the data set to indicate a change from the first encoding scheme to the second encoding scheme identified for the data;

generating an encoded version of the data according to the second encoding scheme; and storing the encoded version of the data as part of the data set in the data store.

15. The non-transitory, computer-readable storage medium of claim 14, wherein the data set is a table, and wherein the program instructions cause the one or more computing devices to implement:
   receiving a request to create the table in the data store;
   determining that the creation request includes a user-specified encoding scheme for at least one of the columns in the table;
   updating the encoding history to identify the user-specified encoding scheme for the at least one column;
   determining that the creation request does not specify an encoding for at least one other one of the columns in the table;
   identifying the first encoding scheme for the at least one other column for the table;
   updating the encoding history to identify the first encoding scheme for the at least one other column;
   wherein the data to add to the table is for the at least one other column in the table.

16. The non-transitory, computer-readable storage medium of claim 15, wherein, in evaluating the change criteria with respect to the source that selected the one encoding scheme indicated in the description of the encoding history to determine whether the source that previously selected the first encoding scheme can be overridden and the first encoding scheme can be changed to the second encoding scheme, the program instructions cause the one or more computing devices to implement determining that the first encoding scheme is not a user-specified encoding scheme.

17. The non-transitory, computer-readable storage medium of claim 15, wherein, in identifying the first encoding scheme for the at least one other column, the program instructions cause the one or more computing devices to implement identifying a default encoding scheme for the table.

18. The non-transitory, computer-readable storage medium of claim 17, wherein, in identifying the second encoding scheme for the data, the program instructions cause the one or more computing devices to implement analyzing the data or a portion of the data to select one of a plurality of different encoding schemes as the second encoding scheme.

19. The non-transitory, computer-readable storage medium of claim 15, wherein the program instructions cause the one or more computing devices to further implement:
   performing the identifying the second encoding scheme for the data in response to determining that the first encoding scheme for the data should be modified.

20. The non-transitory, computer-readable storage medium of claim 14, wherein the data store is a data storage service, wherein the data set is a table stored in the data storage service, and wherein the one or more encoding schemes are determined for the table in response to a request to create the table received at the data storage service.

* * * * *